United States Patent
Bailer et al.

(10) Patent No.: US 7,261,024 B2
(45) Date of Patent: Aug. 28, 2007

(54) DEVICE FOR CLAMPING A WORKPIECE ALONG A ROTATABLY DRIVEN LONGITUDINAL AXIS

(75) Inventors: Peter Bailer, Schemmerhofen (DE); Siegfried Veil, Ochsenhausen (DE)

(73) Assignee: Vollmer Werke Maschinenfabrik GmbH, Biberach (DE)

( * ) Notice: Subject to any disclaimer, the term of this patent is extended or adjusted under 35 U.S.C. 154(b) by 12 days.

(21) Appl. No.: 10/549,298

(22) PCT Filed: Mar. 30, 2004

(86) PCT No.: PCT/EP2004/003363

§ 371 (c)(1),
(2), (4) Date: Sep. 15, 2005

(87) PCT Pub. No.: WO2004/091836

PCT Pub. Date: Oct. 28, 2004

(65) Prior Publication Data

US 2006/0213339 A1    Sep. 28, 2006

(30) Foreign Application Priority Data

Apr. 15, 2003   (DE) ............................... 103 17 326

(51) Int. Cl.
*B23B 33/00* (2006.01)
(52) U.S. Cl. ......................................... 82/165; 82/166
(58) Field of Classification Search .................. 82/165, 82/166, 167, 168, 169
See application file for complete search history.

(56) References Cited

U.S. PATENT DOCUMENTS

| | | | | |
|---|---|---|---|---|
| 2,380,381 | A | * | 7/1945 | Baker .......................... 82/165 |
| 3,108,412 | A | | 10/1963 | Benjamin et al. |
| 3,273,611 | A | * | 9/1966 | Hagquist ..................... 142/53 |
| 4,398,579 | A | | 8/1983 | Holdahl et al. |
| 5,135,810 | A | | 8/1992 | Smith et al. |
| 5,381,213 | A | * | 1/1995 | Michlin ..................... 399/109 |

FOREIGN PATENT DOCUMENTS

| | | |
|---|---|---|
| DE | 3409638 | 9/1985 |
| FR | 2169527 | 9/1973 |

* cited by examiner

*Primary Examiner*—Willmon Fridie, Jr.
(74) *Attorney, Agent, or Firm*—Woodard, Emhardt, Moriarty, McNett & Henry LLP

(57) ABSTRACT

The device is constructed with a tensioning spindle (12), a counter-holder (14) and a carrier (30), at least the tensioning spindle (12) being mounted such that it is rotatable about the longitudinal axis, and the carrier (14) being fixed to the tensioning spindle (12) and, when the workpiece (50) is clamped between the tensioning spindle (12) and the counter-holder (14), being capable of being brought into engagement with the workpiece (50) in such a way that it transmits a rotary movement of the tensioning spindle (12) to the workpiece (50). The device furthermore provides for the carrier to have a spring element (30) which can be coupled to the workpiece (50) under prestress to transmit a torque.

16 Claims, 4 Drawing Sheets

Figure 3:
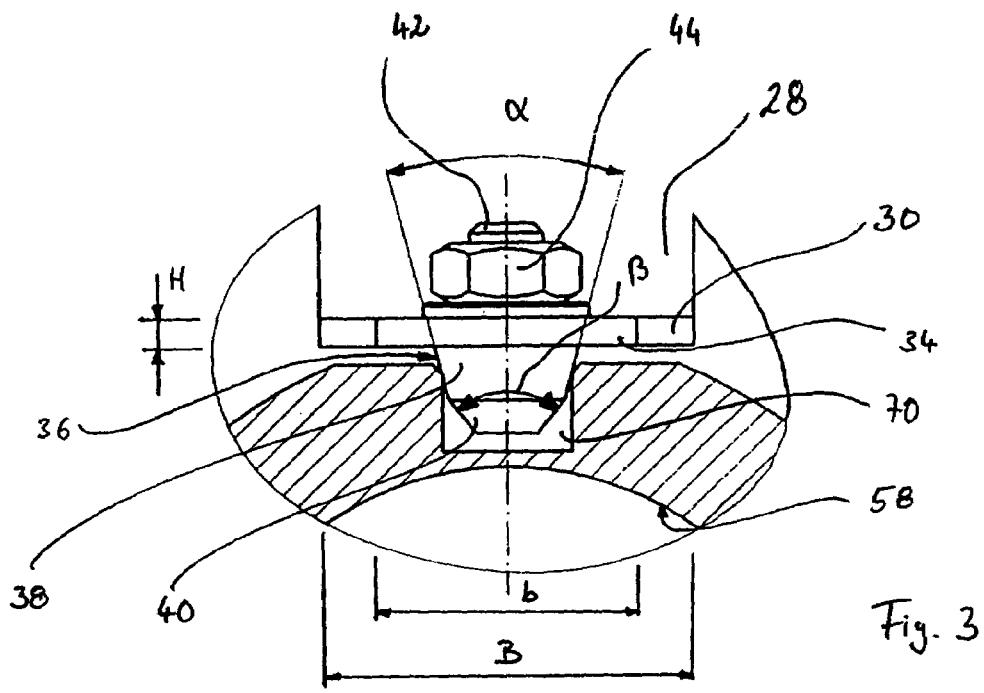

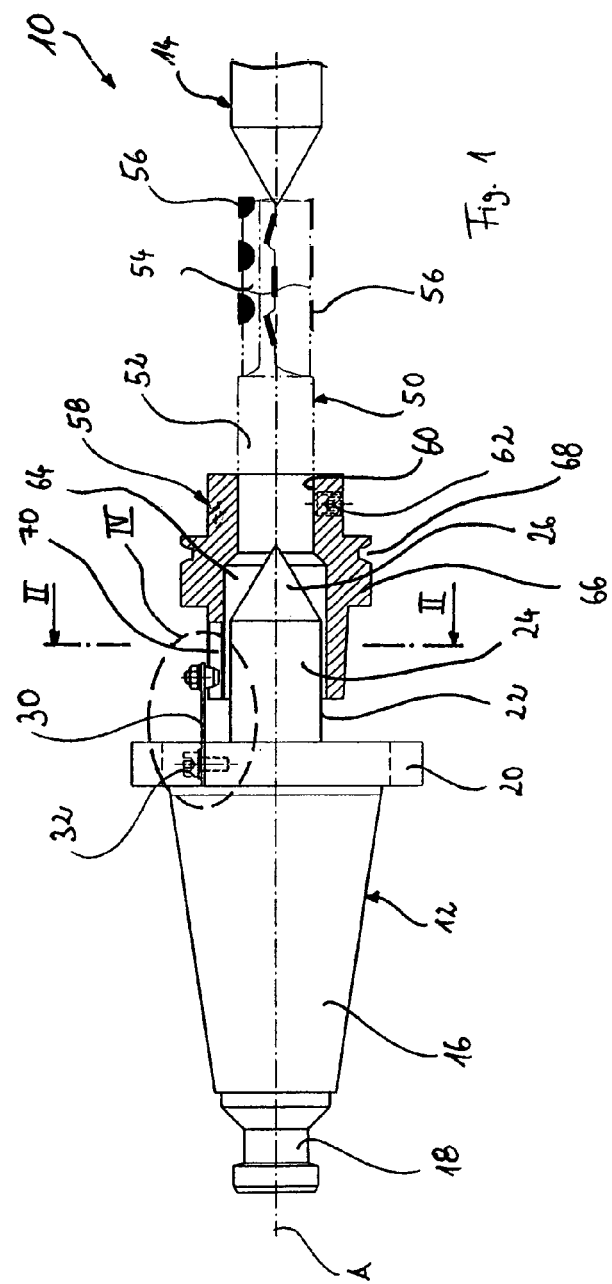
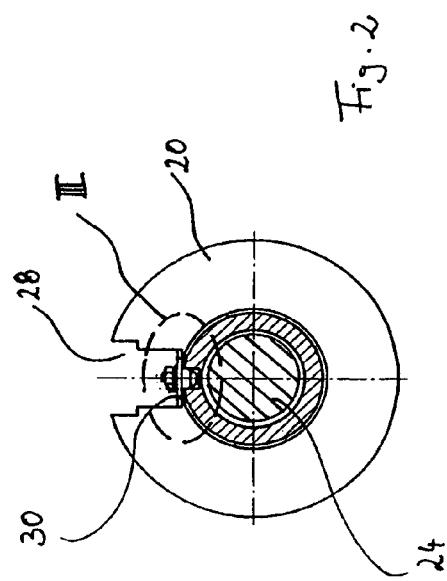
Fig. 1
Fig. 2

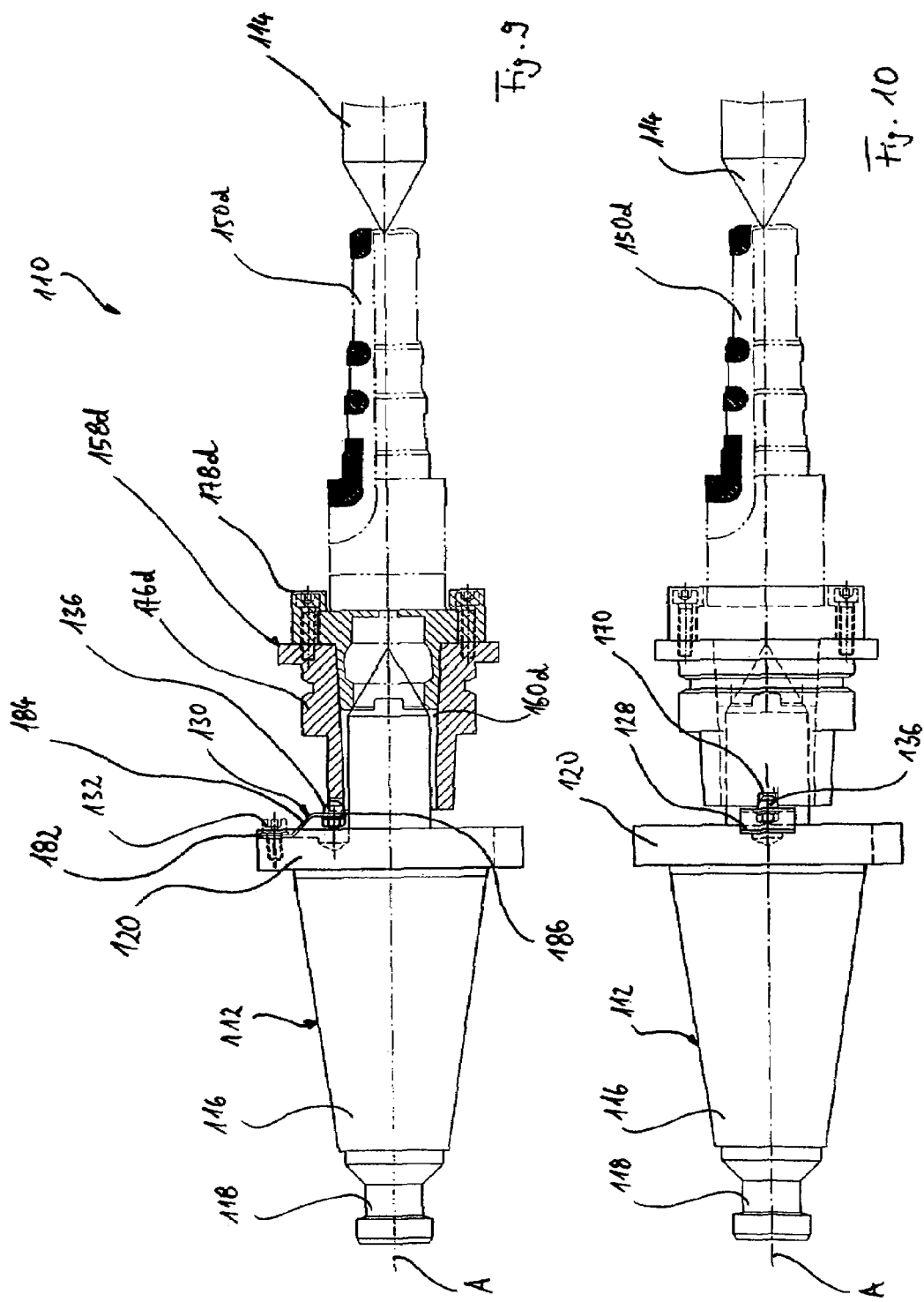

DEVICE FOR CLAMPING A WORKPIECE ALONG A ROTATABLY DRIVEN LONGITUDINAL AXIS

Applicants claim foreign priority benefits under Title 35 U.S.C. §119 of German Patent Application No. 10317326.9, filed Apr. 15, 2003.

The present invention relates to a device for clamping a workpiece on a rotatably drivable longitudinal axis having a tensioning spindle, a counter-holder and a carrier, at least the tensioning spindle being mounted such that it is rotatable about the longitudinal axis, and the carrier being fixed to the tensioning spindle and, when the workpiece is clamped between the tensioning spindle and the counter-holder, being capable of being brought into engagement with the workpiece in such a way that it transmits a rotary movement of the tensioning spindle to the workpiece.

It is normal to clamp workpieces between two points such that they are rotatable about their longitudinal axis and then to machine them on this longitudinal axis. This takes place for example when machining shafts by rotation.

Two points are generally constructed as tensioning spindles, of which one is rotatably driven and equipped with a carrier which acts on the clamped workpiece to be machined to transmit a torque. Pins or profiles which engage in corresponding receiving means or complementary profiles in torque-transmitting manner are, for example, provided as carriers. To this end, the workpiece to be machined must, on the one hand, be constructed appropriately and, on the other, be brought into a specified axial position in relation to the tensioning spindle having the carrier so that transmission of a torque is also actually guaranteed. This causes limitations when using such clamping devices.

By contrast, an object of the present invention is to provide a device of the type described at the outset, which enables simple and variable clamping of workpieces between a tensioning spindle and a counter-holder.

This object is achieved by a device for clamping a workpiece on a rotatably drivable longitudinal axis, which is constructed with a tensioning spindle, a counter-holder and a carrier, at least the tensioning spindle being mounted such that it is rotatable about the longitudinal axis, and the carrier being fixed to the tensioning spindle and, when the workpiece is clamped between the tensioning spindle and the counter-holder, being capable of being brought into engagement with the workpiece in such a way that it transmits a rotary movement of the tensioning spindle to the workpiece. To achieve the above-mentioned object, the invention provides for the carrier to have a spring element which can be coupled to the workpiece under prestress to transmit a torque.

The device according to the invention is therefore constructed relatively simply in terms of the transmission of a torque from the tensioning spindle to the workpiece. The spring element acting under prestress on the workpiece serves for this torque transmission. It is thus possible to always hold the carrier in play-free contact with the workpiece and thus to achieve permanent transmission of a torque from the tensioning spindle to the workpiece by way of the carrier. According to the invention, arranging the carrier on the workpiece under prestress furthermore enables the workpiece to be positioned in different axial positions with respect to the tensioning spindle. This shall be discussed in detail later. At this point, it should merely be noted that this results in a wider variety of possible uses for the device according to the invention than for the prior art.

In a further development of the invention, it is provided for the spring element to comprise a leaf spring which, at one end, is fixed to the tensioning spindle and, at its free end, is constructed with an engagement element, the engagement element being capable of deflection and of being brought into torsion-resistant engagement with the workpiece. The use of a leaf spring enables simple realisation of the carrier with good functionality at the same time. With regard to the leaf spring, it can be provided for this to be received and fixed with form fit in a radial or axial cutout in the tensioning spindle. This enables the leaf spring to be torsion resistant, which is particularly significant in view of its function as a torque-transmitting element.

In order to achieve sufficiently good spring stiffness and, in terms of the torque transmission, to achieve sufficiently high torsional strength, a further development of the invention provides for the leaf spring to have a width which is a multiple of its height. In terms of the structural design of the leaf spring, it can furthermore be provided for the leaf spring to taper in the axial direction.

With regard to the engagement element, which is provided on the free end of the leaf spring, a further development of the invention provides for this to taper in the radial direction. The engagement element can therefore be constructed for example in the shape of a cone. This ensures that the engagement element is always held in contact with a corresponding opening on the workpiece as a result of the prestress produced by the spring element. An exemplary embodiment of the present invention provides for the engagement element to be constructed in the form of a multi-stepped cone, the cone angles increasing with the increasing spacing from the free end of the leaf spring.

Alternatively to a spring element constructed with a leaf spring, a further development of the invention provides for the spring element to comprise a pressure spring which, at its free end, is constructed with an engagement body. In this case, the engagement body can be for example a ball seated on one end of the pressure spring. In this connection, it can furthermore be provided for the pressure spring and the engagement body to be at least partially received in a receiving bore in the tensioning spindle or counter-holder and to be displaceable in this receiving bore with compression of the pressure spring.

It is essentially possible to realise the transmission of a torque between the tensioning spindle and the workpiece through different engagement situations of the carrier on the workpiece. An inventive alternative therefore provides for the spring element to be capable of deflection in the axial direction. A further alternative provides for the spring element to be capable of deflection in the radial direction. Both alternatives ensure reliable transmission of a torque from the tensioning spindle to the workpiece with sufficiently good spring stiffness and torsional strength of the spring element.

So that it is possible to ensure reliable centring of the workpiece on the longitudinal axis, a further development of the invention provides for the tensioning spindle and/or the counter-holder to each have a centring cone. Alternatively, it is also possible for at least one component of the tensioning spindle and counter-holder to be constructed with a geometry which deviates from a centring cone, for example with a circumferential gripper or the like. When using a centring cone, the invention can provide for this to have a centring cone angle in the range between 45° and 75°, preferably between 55° and 65°, particularly preferably of 60°. Such centring cone angles provide good stability and a good centring effect.

It was indicated above that conventional devices are greatly limited, particularly in terms of variability when clamping a workpiece between two points. In order to be able to clamp workpieces of different lengths, a further development of the invention enables the counter-holder to be displaced and fixed in the axial direction. For adaptation to different types of workpiece which are not constructed directly with a corresponding cutout for the engagement of the carrier, the invention provides an adapter element which is constructed to be fixed to the workpiece and which cooperates with the tensioning spindle to clamp the workpiece. When using an adapter element of this type, the workpiece is firstly fixed therein and is then placed on the tensioning spindle together with the adapter element. In this case, the adapter element can be constructed such that it merely serves to transmit a torque from the tensioning spindle to the workpiece, for example by way of a corresponding cutout in which the engagement element engages. However, the workpiece to be clamped is still centred by way of the tensioning spindle and the counter-holder since the adapter element is constructed in such a way that it does not cooperate directly with the tensioning spindle in centring manner. Instead, the tensioning spindle engages in a corresponding centring cutout in the workpiece received in the adapter element.

To transmit a torque from the tensioning spindle to the adapter element, a further development of the invention can provide for the adapter element to have an engagement groove which can be brought into torque-transmitting engagement with the engagement element or engagement body. The engagement groove can extend over a particular length in the axial direction so that the engagement element or engagement body can engage correspondingly in different positions within this engagement groove. This enables axial displacement and positioning of the adapter element with respect to the tensioning spindle so that, when clamping workpieces, greater variability is also provided in terms of their axial positioning.

A further development of the invention provides for the outer circumference of the adapter element to be constructed with a gripper channel in which an external gripper can engage to transport the adapter element. By means of the gripper channel, the adapter element and a workpiece which has previously been clamped therein can be handled more easily. This serves particularly for automatically equipping the device according to the invention with workpieces which have already been provided with adapter elements.

Figure 4:
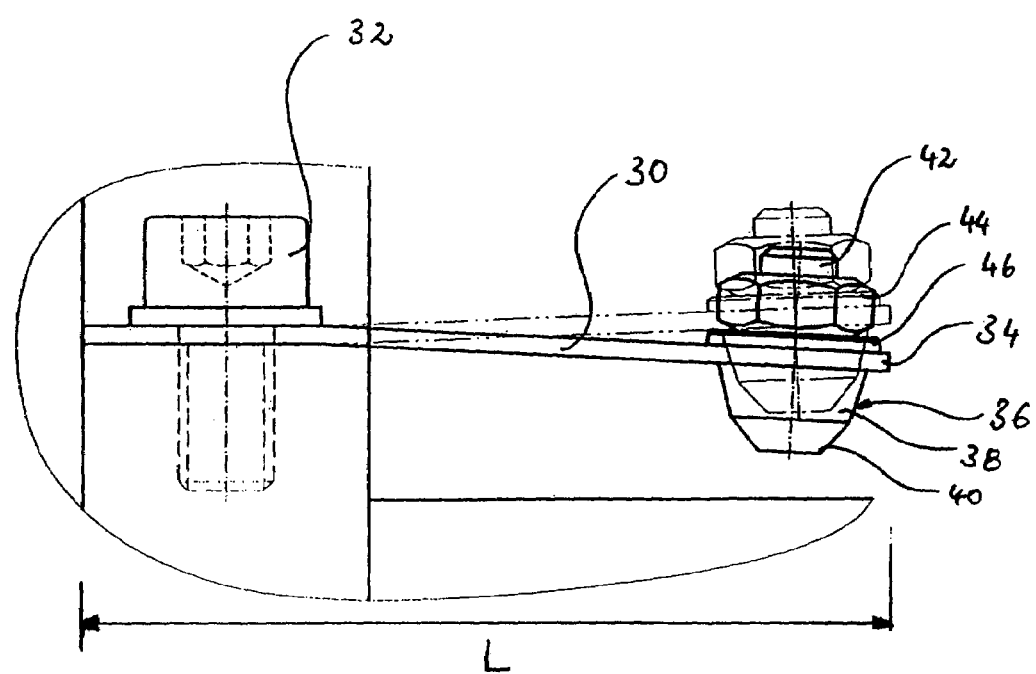
Figure 5:
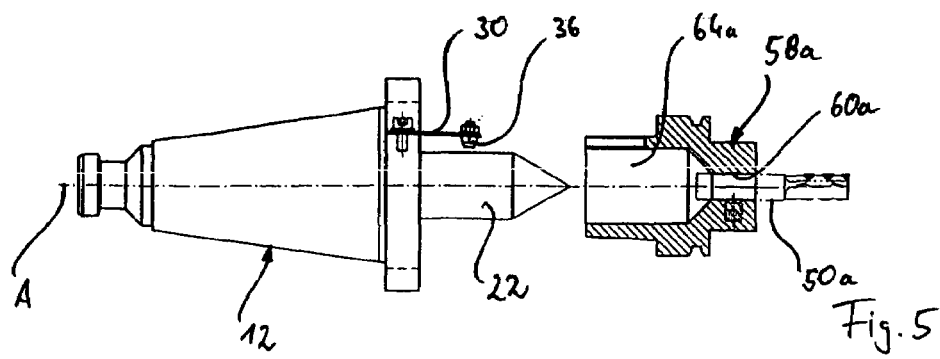
Figure 6:
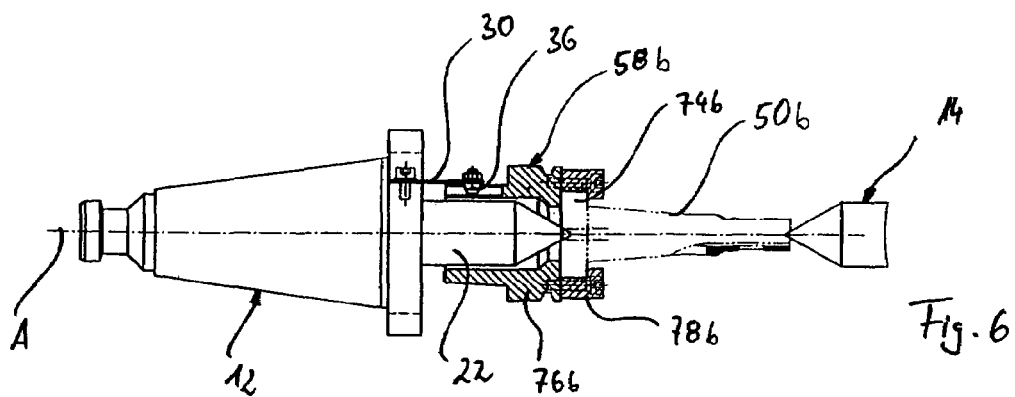
Figure 7:
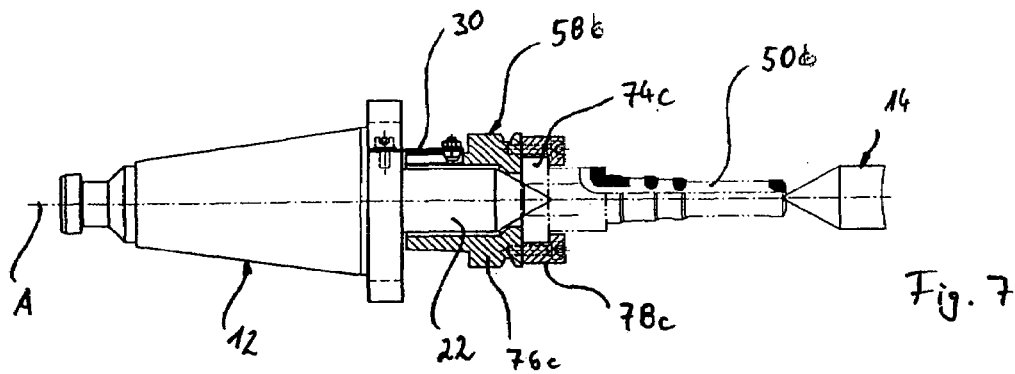
Figure 8:
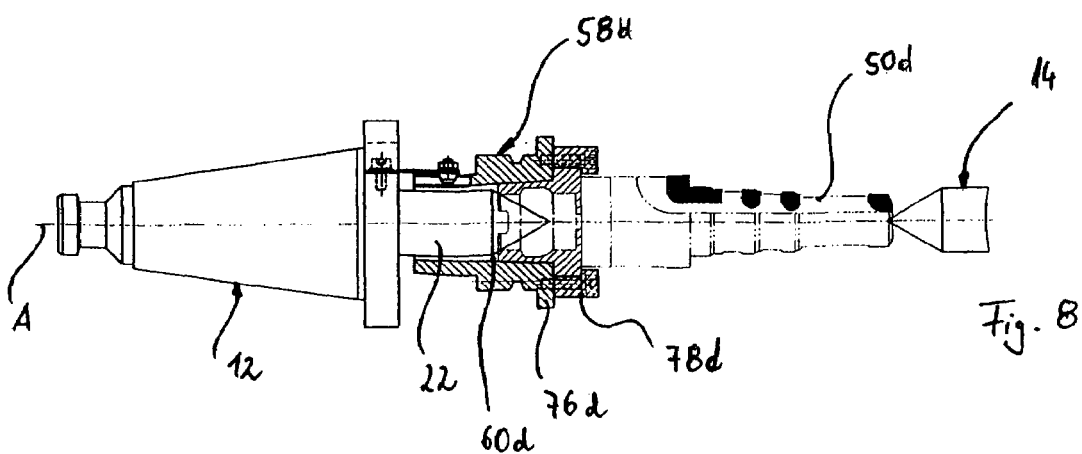

The invention is explained by way of example below with reference to the accompanying figures, which show:

FIG. 1 a schematic longitudinal partial section of an inventive device with a workpiece clamped thereon;

FIG. 2 the cross-section II-II of FIG. 1;

FIG. 3 an enlarged illustration of the detail of the picture denoted by III in FIG. 2;

FIG. 4 an enlarged illustration of the detail of the picture denoted by IV in FIG. 1;

FIG. 5 an illustration according to FIG. 1 during the positioning of a workpiece provided with an adapter element on a tensioning spindle;

FIG. 6 a view according to FIG. 1 in a clamping situation which deviates therefrom;

FIG. 7 a view according to FIGS. 1 and 6 of a further clamping situation;

FIG. 8 a view according to FIGS. 1, 6 and 7 of a further clamping situation;

FIG. 9 a second embodiment of the device according to the invention in a longitudinal section and FIG. 10 a view of the device in FIG. 9, but rotated through 90° about the longitudinal axis.

In FIG. 1, a device according to the invention is denoted in general by 10. This comprises a tensioning spindle 12 which is rotatably drivable about a longitudinal axis A and a counter-holder 14 which is opposite said tensioning spindle.

The tensioning spindle 12 is constructed with a conical coupling shaft 16 and a retention pin 18 adjoining said coupling shaft, which serve to clamp the tensioning spindle 12 in a machine tool in inherently conventional manner. A radial flange 20 adjoins the large-diameter part of the coupling shaft 12. Starting from said radial flange, a spindle 22 having a regular cylindrical portion 24 and a conical tip 26 extends in the direction of the longitudinal axis A.

A radial cutout 28 (shown in more detail in FIGS. 2 and 3) is incorporated in the radial flange 20 of the tensioning spindle 12. Inserted in this cutout is a leaf spring 30 which, starting from the radial cutout 28 as shown in FIGS. 1 and 4, extends to the right in the axial direction. At its end located in the cutout 28, the leaf spring 30 is securely fixed to the tensioning spindle 12 by a cap screw 32. In the region of the cutout 28, the leaf spring has a width B which substantially corresponds to the width of the cutout 28 so that it lies in this cutout with form fit. In the part of the leaf spring 30 which projects from the cutout 28, said leaf spring tapers in terms of its width and, at its free end 34, finally has a width b which is smaller than the width B in the region of the cutout 28. The leaf spring 30 has a height H which is constant over its entire length L. Near to the free end 34, an engagement element 36 is mounted on the leaf spring 30. This engagement element has frustoconical portions, namely the frustoconical portion 38 and the frustoconical portion 40 adjoining this latter. The frustoconical portion 38 has a cone angle α of approximately 30°, the frustoconical portion 40 has a cone angle β of approximately 80°.

Constructed on the engagement element 36 is a threaded shaft 42 onto which a nut 44 is screwed. The nut 44 braces the engagement element 36 against the leaf spring 30 with a washer 46 arranged between them. As revealed in FIG. 4, the free end 34 of the leaf spring 30 can be deflected resiliently in the radial direction together with the engagement element 36.

FIG. 1 furthermore shows a workpiece 50 having a workpiece shaft 52 and a machining region 54 on which cutting edges 56 are mounted. The workpiece 50 is clamped between the spindle 22 and the counter-holder 14 on the longitudinal axis A and is rotatable about this latter.

FIG. 1 furthermore shows that the workpiece shaft 52 is received in an adapter element 58. The adapter element 58 is of a hollow construction and has a first receiving opening 60 which is matched to the outer diameter of the workpiece shaft 52. In this region, a headless screw 62 is screwed into the adapter element to fix the workpiece 50 within the receiving opening 60. The adapter element 58 has a receiving region 64 with a larger diameter, which adjoins the receiving opening 60 and into which the spindle 22 projects with radial play. Thus, the workpiece 50 can be clamped in inherently conventional manner between the two points of the spindle 22 and the counter-holder 14 without the adapter element 58 assuming centring properties.

On its outer surface, the adapter element 58 has an annular shoulder 66 in which a gripper channel 68 is constructed in the circumferential direction. This gripper channel serves for simple handling of the adapter element 58 and the workpiece 50 clamped therein. The adapter element 58 furthermore has, on its outer circumference, an engagement groove 70. As shown in FIG. 3, the engagement groove 70 has a substantially rectangular cross-section and, starting from the left end of the adapter element 58 (as seen in FIG. 1) extends over approximately a third of its length. The engagement element 36 engages in the engagement groove 70 and is held in contact with the flanks of the engagement groove 70 by the leaf spring 30 (as shown in FIG. 3). This means that, as a result of the spring action of the leaf spring 30, the engagement element 36 is always held in play-free contact with the flanks of the engagement groove 70. By way of the engagement of the engagement element 36 in the engagement groove 70, a torque can be transmitted from the tensioning spindle 12 to the adapter element 58 by way of the leaf spring 30, and from said adapter element to the workpiece 50.

FIG. 1 shows that the axial position of the adapter element 58 in relation to the tensioning spindle 12 is determined by the position of the workpiece 50 when it is received in the adapter element 58 and fixed by way of the headless screw 62. It is easy to deduce from this that, as a result of clamping the workpiece 50 differently within the adapter element 58, the adapter element 58 can also assume an axial position in relation to the tensioning spindle 12 which differs from that in FIG. 1. A torque can still be transmitted since the engagement element 36 can engage in the engagement groove 70 over the entire length of this latter and transmit a torque from the tensioning spindle 12 to the adapter element 58 by way of the leaf spring 30.

FIGS. 5 to 8 now show further clamping situations which will be described below.

FIG. 5 shows a situation during the clamping of a workpiece 50a on the tensioning spindle 12, the external dimensions of said workpiece deviating from those of the workpiece 50 according to FIG. 1. To this end, an adapter element 58 is used which, in its receiving region 64a receiving the tensioning spindle 22, is constructed to be substantially the same as the adapter element 58 in FIG. 1 but, in the region of the receiving opening 60a, is matched to the external dimensions of the workpiece 50a. In order to simplify the drawing, FIG. 5 does not show the counter-holder 14.

FIG. 6 shows a clamping situation similar to that in FIG. 1, with a workpiece 50b clamped between the tensioning spindle 22 and the counter-holder 14, said workpiece having a flange 74b on its end facing the tensioning spindle 22. To fix the flange 74b, and therefore the entire workpiece 50b, in the adapter element 58b, this latter is constructed in two parts. It comprises a first adapter part 76b and a second adapter part 78b. The first adapter part 76b serves to receive the tensioning spindle 22 and the engagement element 36 and is therefore of a similar construction to the adapter element 58 in FIG. 1 in its region near to the tensioning spindle 22. The adapter part 78b is constructed in the form of a cover and has a central opening through which the workpiece 50b can extend in the axial direction. The adapter part 78b surrounds the flange 74b and is screwed securely to the adapter part 76b, and braced against it, by means of cap screws. Thus, the flange 74b, and with it the workpiece 50b, is seated securely in the two-part adapter element 58b. It can be centred between the tensioning spindle 22 and the counter-holder 14 on the axis A and, by way of the tensioning spindle 12, can be rotatably driven with the transmission of a torque by means of the leaf spring 30 and the engagement element 36.

Fig 7 shows a similar clamping situation to that in FIG. 6. Again, a two-part adapter element 58c is used, which, after the adapter parts 76c and 78c have been braced against one another, receives the flange 74c of a workpiece 50c securely inside it. However, the workpiece 50c has an internal bore which has a larger diameter than the workpiece 50b and in which the spindle 22 dips with its conical tip 26. As a result of the larger diameter of the internal bore, the spindle has to dip axially further into the workpiece 50c to centre this latter. This results in the axial position of the adapter element 58c in relation to the tensioning spindle 12 deviating from that shown in FIG. 6.

By comparison with the illustrations in FIG. 6 and FIG. 7, it can be seen that variable and diverse clamping of different workpieces is possible using the device according to the invention.

FIG. 8 shows a further clamping situation. Again, a two-part adapter element 58d is used to clamp the workpiece 50d, with the adapter part 78d being braced against the adapter part 76d by way of cap screws. In this, a conical end region of the workpiece 50d is received in a correspondingly conically constructed receiving opening 60d in the adapter element 58d.

Starting with the clamping situation according to FIG. 8, a second exemplary embodiment of the present invention will now be described with reference to FIGS. 9 and 10. To avoid repetition and to simplify the description, the reference numerals used for similar or similar-acting components shall be the same as those for the description of FIGS. 1 to 8, albeit with the numeral "1" placed in front.

The embodiment according to FIGS. 9 and 10 differs from the first embodiment according to FIGS. 1 to 8 in that the leaf spring 130 is constructed in such a way that, in the axial direction, it engages in a corresponding engagement groove 170 opening in the axial direction and therefore ensures the transmission of a torque.

To this end, the leaf spring 130 is of a stepped construction. It is fixed by a first portion 182 on the radial flange 120 in a cutout opening in the axial direction by way of the cap screw 132. The cutout 128 is again dimensioned according to the leaf spring 130 so that the leaf spring 130 lies in the cutout 128 with form fit. Starting from the portion 132, the leaf spring 130 then extends by way of a portion 184 extending obliquely downwards (as seen in FIG. 9) to a portion 186 extending substantially orthogonally to the longitudinal axis A, said portion 186 being capable of resilient deflection in the axial direction.

The engagement element 136 is mounted on the portion 186, and, more precisely, substantially in the same manner as described with reference to FIGS. 1 to 4. The engagement element 136 engages in the corresponding axial engagement groove 170 on the adapter element 158d.

A torque is in turn transmitted from the tensioning spindle 112 to the workpiece 150d with the leaf spring 130 and the engagement element 136 engaging in the corresponding engagement groove 170, so that this workpiece can be rotatably driven about the axis A.

It was explained above that the device according to the invention enables workpieces to be clamped between a tensioning spindle and a counter-holder, particularly between two points, in diverse and variable manner.

The invention claimed is:

1. A device (10; 110) for clamping a workpiece (50, 50a, 50b, 50c 50d; 150d) on a rotatably drivable longitudinal axis having:
    a tensioning spindle (12; 112)
    a counter-holder (14; 114) and
    a carrier,
    at least the tensioning spindle (12; 112) being mounted such that it is rotatable about the longitudinal axis (A), and the carrier being fixed to the tensioning spindle (12; 112) and, when the workpiece (50, 50a, 50b, 50c, 50d; 150d) is clamped between the tensioning spindle (12; 112) and the counter-holder (14; 114), being capable of being brought into engagement with the workpiece (50, 50a, 50b, 50c, 50d; 150d) in such a way that it transmits a rotary movement of the tensioning spindle (12; 112) to the workpiece (50, 50a, 50b, 50c, 50d; 150d), the carrier having a spring element (30; 130), characterised by an adapter element (58; 158) which is constructed to be fixed to the workpiece (50, 50a, 50b, 50c, 50d; 150d) and which cooperates with the tensioning spindle (12; 112) to clamp the workpiece (50, 50a, 50b, 50c, 50d; 150d), the spring element (30; 130) acting on the adapter element (58, 58a, 58b, 58c, 58d; 158d) under prestress to transmit a torque or being capable of being brought into engagement with said adapter element.

2. A device (10; 110) for clamping a workpiece (50, 50a, 50b, 50c 50d; 150d) on a rotatably drivable longitudinal axis having:

a tensioning spindle (12; 112)

a counter-holder (14; 114) and a carrier, at least the tensioning spindle (12; 112) being mounted such that it is rotatable about the longitudinal axis (A), and the carrier being fixed to the tensioning spindle (12; 112) and, when the workpiece (50, 50a, 50b, 50c, 50d; 150d) is clamped between the tensioning spindle (12; 112) and the counter-holder (14; 114 being capable of being brought into engagement with the workpiece (50, 50a, 50b, 50c, 50d; 150d) in such a way that it transmits a rotary movement of the tensioning spindle (12; 112) to the workpiece (50, 50a, 50b, 50c, 50d; 150d).

the carrier having a spring element (30; 130), characterised by an adapter element (58; 158) which is constructed to be fixed to the workpiece (50, 50a, 50b, 50c, 50d; 150d) and which cooperates with the tensioning spindle (12; 112) to clamp the workpiece (50, 50a, 50b, 50c, 50d; 150d) the sprint element (30; 130) acting on the adapter element (58, 58a, 58b, 58c, 58d; 158d) under prestress to transmit a torque or being capable of being brought into engagement with said adapter element; and, characterised in that the spring element comprises a leaf spring (30; 130) which, at one end, is fixed to the tensioning spindle (12; 112) and, at its free end, is constructed with an engagement element (36; 136), the engagement element (36; 136) being capable of deflection and of being brought into torsion-resistant engagement with the workpiece (50, 50a, 50b, 50c, 50d; 150d).

3. A device (10; 110) according to claim 2, characterised in that the leaf spring (30; 130) is received and fixed with form fit in a radial or axial cutout (28; 128) in the tensioning spindle (12; 112).

4. A device (10; 110) according to claim 2, characterised in that the leaf spring (30; 130) has a width (B, b) which is a multiple of the height (H).

5. A device (10) according to claim 2, characterised in that the leaf spring (30) tapers in the axial direction.

6. A device (10) according to claim 2, characterised in that the engagement element (36) tapers.

7. A device (10; 110) according to claim 2, characterised in that the engagement element (10; 110) is constructed in the form of a multi-stepped cone (38; 40), the cone angles ($\alpha$, $\beta$) increasing with the increasing spacing from the free end of the leaf spring (30; 130).

8. A device according to claim 1, characterised in that the spring element comprises a pressure spring which, at its free end, is constructed with an engagement body.

9. A device (10; 110) for clamping a workpiece (50, 50a, 50b, 50c, 50d; 150d) on a rotatably drivable longitudinal axis having:

a tensioning spindle (12; 112)

a counter-holder (14; 114) and a carrier, at least the tensioning spindle (12; 112) being mounted such that it is rotatable about the longitudinal axis (A), and the carrier being fixed to the tensioning spindle (12;112) and, when the workpiece (50, 50a, 50b, 50c, 50d; 150d) is clamped between the tensioning spindle (12; 112) and the counter-holder (14:114) being capable of being brought into engagement with the workpiece (50, 50a, 50b, 50c, 50d; 150d) in such a way that it transmits a rotary movement of the tensioning spindle (12; 112) to the workpiece (50, 50a, 50b, 50c, 50d; 150d), the carrier having a spring element (30; 130), characterised by an adapter element (58; 158) which is constructed to be fixed to the workpiece (50, 50a, 50b, 50c, 50d; 150d) and which cooperates with the tensioning spindle (12; 112) to clamp the workpiece (50, 50a, 50b, 50c, 50d; 150d), the spring element (30; 130) acting on the adapter element (58, 58a, 58b, 58c, 58d; 158d) under prestress to transmit a torque or being capable of being brought into engagement with said adapter element, in that the spring element comprises a pressure spring which, at its free end, is constructed with an engagement body, characterised in that the pressure spring and the engagement body are at least partially received in a receiving bore in the tensioning spindle or the counter-holder and are displaceable in said receiving bore with compression of the pressure spring.

10. A device (110) according to claim 1, characterised in that the spring element (130) can be deflected in the axial direction.

11. A device (10) according to claim 1, characterised in that the spring element (30) can be deflected in the radial direction.

12. A device (10; 110) according to claim 1, characterised in that the tensioning spindle (12; 112) and/or the counter-holder (14; 114) each have a centring cone.

13. A device (10; 110) according to claim 12, characterised in that the centring cone has a centring cone angle in the range between 45° and 75°, preferably between 55° and 65°, particularly preferably of 60°.

14. A device (10; 110) according to claim 1, characterised in that the counter-holder (14; 114) can be displaced and fixed in the axial direction.

15. A device (10; 110) for clamping a workpiece (50, 50a, 50b, 50c, 50d; 150d) on a rotatably drivable longitudinal axis having:

a tensioning spindle (12; 112)

a counter-holder (14; 114) and a carrier, at least the tensioning spindle (12; 112) being mounted such that it is rotatable about the longitudinal axis (A), and the carrier being fixed to the tensioning spindle (12; 112) and, when the workpiece (50, 50a, 50b, 50c, 50d; 150d)

is clamped between the tensioning spindle (12; 112) and the counter-holder (14; 114), being capable of being brought into engagement with the workpiece (50, 50*a*, 50*b*, 50*c*, 50*d*; 150*d*) in such a way tat it transmits a rotary movement of the tensioning spindle (12; 112) to the workpiece (50, 50*a*, 50*b*, 50*c*, 50*d*; 150*d*), the carrier having a spring element (30; 130), characterised by an adapter element (58; 158) which is constructed to be fixed to the workpiece (50, 50*a*, 50*b*, 50*c*, 50*d*; 150*d*) and which cooperates with the tensioning spindle (12; 112) to clamp the workpiece (50, 50*a*, 50*b*, 50*c*, 50*d*; 150*d*), the spring element (30; 130) acting on the adapter element (58, 58*a*, 58*b*, 58*c*, 58*d*; 158*d*) under prestress to transmit a torque or being capable of being brought into engagement with said adapter element, characterised in that the adapter element (58; 158) has an engagement groove (70; 170) which can be brought into torque-transmitting engagement with the engagement element (36; 136) or engagement body.

16. A device (10; 110) for clamping a workpiece (50, 50*a*, 50*b*, 50*c*, 50*d*; 150*d*) on a rotatably drivable longitudinal axis having:
    a tensioning spindle (12; 112)
    a counter-holder (14; 114) and
    a carrier,
    at least the tensioning spindle (12; 112) being mounted such that it is rotatable about the longitudinal axis (A), and
    the carrier being fixed to the tensioning spindle (12; 112) and, when the workpiece (50, 50*a*, 50*b*, 50*c*, 50*d*; 150*d*) is clamped between the tensioning spindle (12; 112) and the counter-holder (14; 114), being capable of being brought into engagement with the workpiece (50, 50*a*, 50*b*, 50*c*, 50*d*; 150*d*) in such a way tat it transmits a rotary movement of the tensioning spindle (12; 112) to the workpiece (50, 50*a*, 50*b*, 50*c*, 50*d*; 150*d*), the carrier having a spring element (30; 130).

characterised by an adapter element (58; 158) which is constructed to be fixed to the workpiece (50, 50*a*, 50*b*, 50*c*, 50*d*; 150*d*) and which cooperates with the tensioning spindle (12; 112) to clamp the workpiece (50, 50*a*, 50*b*, 50*c*, 50*d*; 150*d*), the spring element (30; 130) acting on the adapter element (58, 58*a*, 58*b*, 58*c*, 58*d*; 158*d*) under prestress to transmit a torque or being capable of being brought into engagement with said adapter element, characterised in that, at its outer circumference, the adapter element (58; 158) is constructed with a gripper channel (68; 168) in which an external gripper can engage to transport the adapter element (58; 158).

* * * * *